(12) United States Patent
Hao et al.

(10) Patent No.: US 9,779,524 B2
(45) Date of Patent: Oct. 3, 2017

(54) VISUALIZATION THAT INDICATES EVENT SIGNIFICANCE REPRESENTED BY A DISCRIMINATIVE METRIC COMPUTED USING A CONTINGENCY CALCULATION

(71) Applicant: HEWLETT-PACKARD DEVELOPMENT COMPANY, L.P., Houston, TX (US)

(72) Inventors: Ming C. Hao, Palo Alto, CA (US); Sebastian Mittelstaedt, Constance (DE); Umeshwar Dayal, Saratoga, CA (US); Meichun Hsu, Los Altos Hills, CA (US); Daniel Keim, Steisslingen (DE)

(73) Assignee: Hewlett Packard Enterprise Development LP, Houston, TX (US)

( * ) Notice: Subject to any disclaimer, the term of this patent is extended or adjusted under 35 U.S.C. 154(b) by 942 days.

(21) Appl. No.: 13/745,985

(22) Filed: Jan. 21, 2013

(65) Prior Publication Data
US 2014/0204090 A1    Jul. 24, 2014

(51) Int. Cl.
*G06T 11/20*    (2006.01)
(52) U.S. Cl.
CPC .................. *G06T 11/206* (2013.01)
(58) Field of Classification Search
CPC ..................................... G06T 11/206
USPC ........................................ 345/440
See application file for complete search history.

(56) References Cited

U.S. PATENT DOCUMENTS

| | | |
|---|---|---|
| 6,144,379 A | 11/2000 | Bertram et al. |
| 6,400,366 B1 | 6/2002 | Davies et al. |
| 7,038,680 B2 | 5/2006 | Pitkow |
| 7,603,458 B1 | 10/2009 | Sexton |
| 7,650,262 B2 | 1/2010 | Pearson |
| 7,941,742 B1 | 5/2011 | Hao et al. |
| 2002/0059293 A1 | 5/2002 | Hirsch |
| 2003/0030634 A1 | 2/2003 | Sang'udi et al. |
| 2005/0195154 A1 | 9/2005 | Robbins et al. |
| 2006/0026163 A1* | 2/2006 | Forman et al. ............. 707/10 |
| 2006/0028471 A1 | 2/2006 | Kincaid et al. |
| 2006/0059439 A1 | 3/2006 | Hao et al. |
| 2006/0287831 A1 | 12/2006 | Totiba |
| 2010/0055662 A1* | 3/2010 | Betebenner ........ G09B 7/00 434/430 |
| 2010/0103176 A1 | 4/2010 | Hao et al. |

(Continued)

OTHER PUBLICATIONS

Srinivasan Iyer et al., Adverse Event Profiles for Multi-drug Combinations, CS 341 Report, 2012 (10 pages).
Bozdog, D. et al, "Rare Events Analysis for High frequency Equity Data", Sep. 20, 2011 (13 pages).

(Continued)

*Primary Examiner* — Barry Drennan
*Assistant Examiner* — Shivang Patel

(57) ABSTRACT

Using a contingency calculation based on a number of events sharing a collection of values of plural attributes, a discriminative metric is computed representing a statistical significance of the events that share the collection of values of the plural attributes. A visualization is generated that includes cells representing respective events, the visualization including a region containing a subset of the cells corresponding to the collection of values of the plural attributes, and the visualization including a significance visual indicator associated with the region to indicate the statistical significance of the events sharing the collection of values of the plural attributes.

19 Claims, 7 Drawing Sheets

(56) References Cited

U.S. PATENT DOCUMENTS

| | | |
|---|---|---|
| 2010/0107063 A1 | 4/2010 | Hao et al. |
| 2010/0188413 A1 | 7/2010 | Hao et al. |
| 2010/0191678 A1 | 7/2010 | Steed |
| 2010/0231594 A1 | 9/2010 | Hao et al. |
| 2011/0298804 A1 | 12/2011 | Hao et al. |
| 2012/0041801 A1 | 2/2012 | Mascarenhas |
| 2012/0060080 A1 | 3/2012 | Hao et al. |
| 2013/0093787 A1 | 4/2013 | Fulks et al. |
| 2013/0194272 A1 | 8/2013 | Hao et al. |
| 2013/0257903 A1 | 10/2013 | Hao et al. |
| 2013/0298085 A1 | 11/2013 | Kritt et al. |

OTHER PUBLICATIONS

Alsrheed, F.S. "To Develop a New Approach to the Visualization of Multivariate Datasets Based on the Scatterplot Concept", 2008 (68 pages).

Wikipedia, Single-linkage clustering, Sep. 7, 2012 (2 pages).

David Meyer et al., Visualizing Multi-way Contingency Tables, Oct. 2006 (27 pages).

Ming C. Hao et al., U.S. Appl. No. 13/714,871 entitled Visualizing a Relationship of Attributes Using a Relevance Determination Process to Select From Candidate Attribute Values filed on Dec. 14, 2012 (27 pages).

US; Non-Final Office Action cited in U.S. Appl. No. 13/873,673; mailed Jul. 30, 2015; 30 pages.

Hao, M C., et al; Final Office Action cited in U.S. Appl. No. 13/873,673; mailed Jan. 13, 2016; 32 pages.

Hao, M. C., et al.; "Non-Final Office Action cited in U.S. Appl. No. 13/873,673"; mailed Jun. 10, 2016; 20 pages.

\* cited by examiner

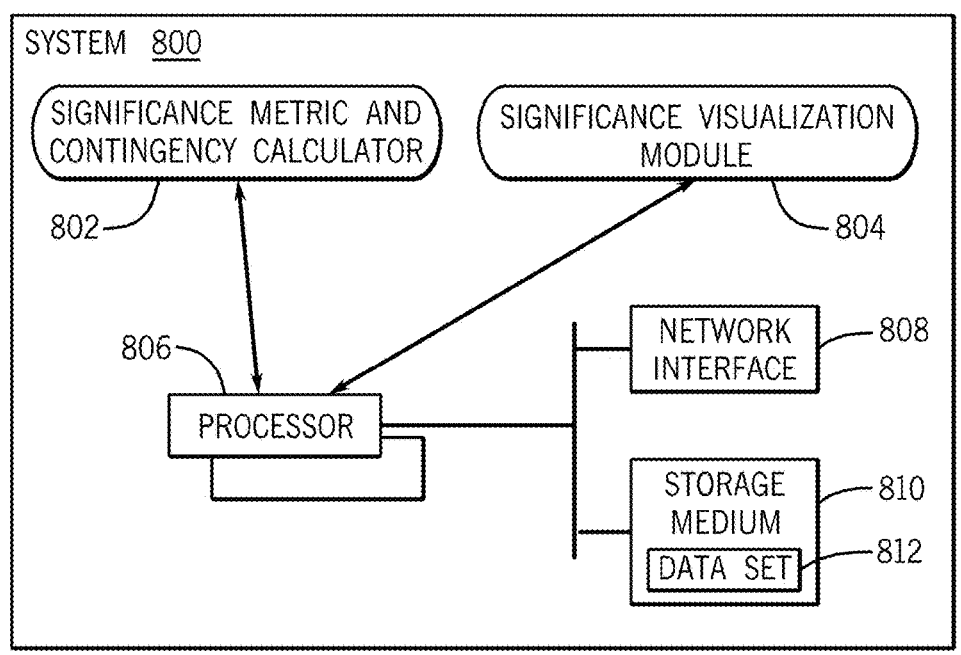

US 9,779,524 B2

VISUALIZATION THAT INDICATES EVENT SIGNIFICANCE REPRESENTED BY A DISCRIMINATIVE METRIC COMPUTED USING A CONTINGENCY CALCULATION

BACKGROUND

With traditional techniques of visualizing attributes (or variables) of data records, it can be difficult to understand the relationship of the attributes. There can be a relatively large number of data records, and certain attributes of the data records can be associated with a relatively large number of categorical values. When a relatively large amount of information is to be visualized, the result can be a cluttered visualization where users have difficulty in understanding the visualized information.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Some embodiments are described with respect to the following figures:

FIG. 7 illustrates an example feature vector matrix, in accordance with some implementations; and FIG. 8 is a block diagram of a system that is able to incorporate some implementations.

DETAILED DESCRIPTION

Large amounts of data may not be effectively visualized in a traditional graphical visualization. There can be relatively large amounts of data records, and the data records may have attributes associated with relatively large numbers of categorical values. One example attribute is a Drug attribute, which can have many categorical values representing different drugs. Another example attribute is a Reaction attribute, which can have many categorical values representing respective reactions to drugs. A categorical value of an attribute is represented by a character string. For example, a categorical value of the Drug attribute is represented by the name of a drug.

Visualizing all of the possible categorical values of the Drug attribute and Reaction attribute that are found in a relatively large number of data records can result in a cluttered visualization, which can make it difficult for a user to identify which events represented in the visualization are more significant than other events that are visualized. For example, in the context of the Drug and Reaction attributes discussed above, it may be desirable to identify reactions to various drugs that are more significant than other reactions, so that an analyst can focus his or her analysis on the more significant reactions.

In accordance with some implementations, to more effectively visualize attributes that appear in data records, a cell-based visualization is provided that highlights certain groups of cells with significance visual indicators that indicate relative significance of the respective groups of cells. The cell-based visualization can plot cells (also referred to as pixels) representing respective events at points on a visualization screen. An event (e.g. corresponding to a drug-reaction pair) is expressed by a corresponding data record.

Figure 1:
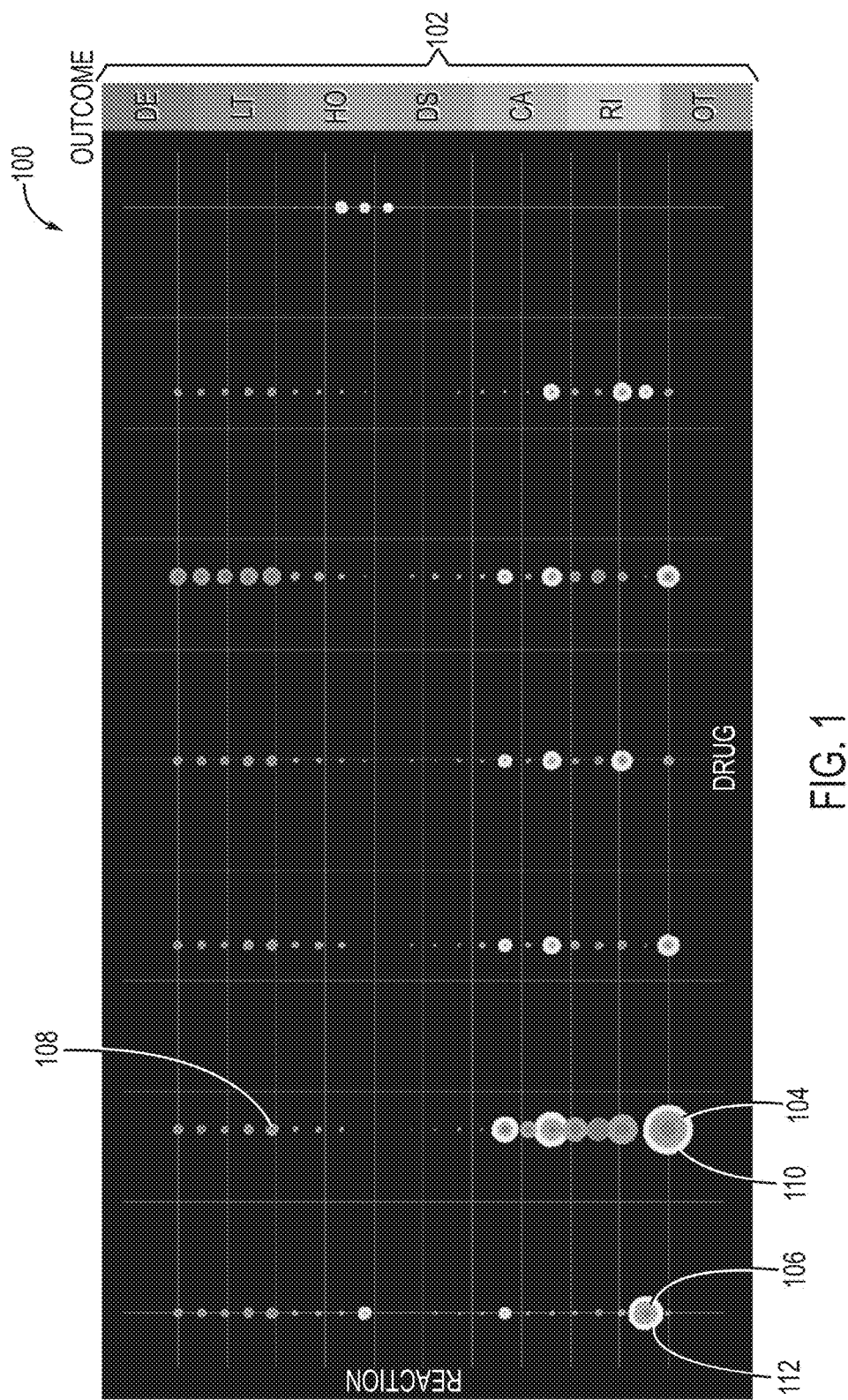
FIG. 1 is a graphical view of an example visualization screen that depicts a relationship among attributes, along with visual indicators that indicate corresponding statistical significance of subsets of cells contained in the visualization screen, in accordance with some implementations.

An example visualization screen 100 is shown in FIG. 1. The visualization screen 100 has a horizontal axis (x axis) and a vertical axis (y axis), which represent respective first and second attributes. The visualization screen 100 includes an x-y cell plane. In the example of FIG. 1, the x attribute is "Drug," and they attribute is "Reaction." A cell (or pixel) represents a respective event and corresponds to a respective pair of a categorical value of the x attribute and a categorical value of they attribute in the respective data record. The cell is plotted at a position of the visualization screen 100 based on the categorical value of the x attribute and the categorical value of they attribute in the respective data record.

A cell refers to a graphical element that is used for representing an event that corresponds to an x-y value pair. A cell can be in the form of a dot or graphical structure of any other shape. An event is expressed by a data record, and a data record can refer to any discrete unit of data that is received by a system. Each data record can have multiple attributes that represent different aspects of an event. For example, in the context of analysis relating to a drug trial, the events can include consumption of various different drugs by individuals, along with the corresponding reactions. The information collected in the drug trial can include reactions of the individuals to consumption of the drugs, as well as the corresponding outcomes. As an example, a data record can include the following attributes: Drug, Reaction, and Outcome (among other attributes). The Drug attribute can have multiple categorical values that represent different drugs. The Reaction attribute can have different categorical values that represent different reactions by individuals. The Outcome attribute can have multiple categorical values that represent different outcomes associated with respective drug-reaction pairs.

The categorical values of the Drug attribute can include drug names that identify different types of drugs that are the subject of analysis. Similarly, the categorical values of the Reaction attribute and Outcome attribute can represent different reactions and different outcomes, respectively, associated with taking the drugs. In the visualization screen 100 of FIG. 1, an x coordinate represents the different categorical values of the Drug attribute, while a y coordinate represents the different categorical values of the reaction attribute.

The cells in the graphical visualization 100 can also be assigned visual indicators (e.g. different colors, different gray scale indicators, different patterns, etc.) according to values of a third attribute (different from the x and y attributes) in the respective data records. In the example of FIG. 1, the third attribute is the Outcome attribute. Different colors are assigned to the cells in FIG. 1 according to different categorical values of the Outcome attribute. In a different example, the colors assigned to the cells can be based on numerical attributes of a different attribute. A color scale 102 in the graphical visualization 100 maps different values of the Outcome attribute to different colors. In an example, the different values of the outcome attribute can include the following: a DE value (which represents death as the outcome), an LT value (which represents a life-threatening condition as the outcome), an HO value (which represents hospitalization as the outcome), a DS value (which represents disability as the outcome), a CA value (which represents a congenital anomaly as the outcome), an RI value (which represents intervention as the outcome), and an OT value (which represents an "other" outcome). Although specific values of the Outcome attribute are shown in FIG. 1, it is noted that in other examples, other values of the Outcome attribute can be used.

Moreover, even though the example graphical visualization 100 depicts a visualization of the Drug attribute, Reaction attribute, and Outcome attribute, it is noted that the graphical visualization 100 can similarly be used for representing a relationship among other attributes in other examples.

Several example groups of cells are identified as 104, 106, and 108 in FIG. 1. The group 104 of cells includes cells assigned the red color (where the red color corresponds to the Outcome attribute having the DE value) and cells assigned the green color (where the green color corresponds to the HO value). The cells in the group 104 are plotted in a first region of the visualization screen 100.

The group 106 of cells include cells assigned the red color, cells assigned the green color, and cells assigned the brown color (which corresponds to the Outcome attribute having the OT value). The cells in the group 106 are plotted in a second region of the visualization screen 100.

The group 108 of cells include cells assigned the red color, cells assigned the green color, and cells assigned the brown color. The cells in the group 108 are plotted in a third region of the visualization screen 100. Since there are a smaller number of cells in the group 108 as compared to the group 106, the third region is smaller than the second region.

In accordance with some implementations, a significance visual indicator is associated with each of the groups 104 and 106 of cells. A significance visual indicator 110 is associated with the group 104 of cells, while a significance indicator 112 is associated with the group 106 of cells. However, a significance visual indicator is not associated with the group 108 of cells.

In some implementations, each significance visual indicator includes a ring having a brightness that is based on the corresponding degree of significance of the corresponding group of cells. The ring surrounds the respective group of cells. For example, the ring 110 surrounds the group 104 of cells, while the ring 112 surrounds the group 106 of cells. The degree of significance of a group of cells can be indicated by a value of a significance metric that represents a statistical significance of the group of cells. In some examples, a statistical significance can refer to significance that is computed based on relative distributions of events having corresponding attribute values. Further details regarding computation of a significance metric are discussed below.

The degree of brightness of the significance visual indicator is adjusted based on the value of the significance metric. A group of cells associated with a higher significance is assigned a significance visual indicator of greater brightness, whereas a group of cells associated with lower significance is assigned a visual indicator having reduced brightness.

A group of cells associated with a significance metric value that does not satisfy a specified criterion is not assigned a significance visual indicator. For example, for each given x attribute value, the N (N≥1) highest significance metric values are selected. These N highest significance metric values correspond to respective N groups of cells. In such examples, the N groups of cells are those groups that satisfy the specified criterion. Significance visual indicators are provided for these N groups of cells in a visualization.

In the example of FIG. 1, the group 108 of cells has a respective significance metric value that does not satisfy the specified criterion, as a result, no significance visual indicator is provided around the group 108 of cells. In the example of FIG. 1, N=3, since three significance visual indicators are associated with corresponding groups of cells for each respective value of the x attribute (the Drug attribute).

In other examples, other specified criteria can be used for determining whether or not a significance visual indicator is to be associated with a group of cells. For example, whether or not a significance visual indicator is assigned a group of cells can be based on comparing the respective significance metric value to a specified threshold. If the significance metric value does not have a predefined relationship (e.g. greater than, less than, equal to, etc.) to the specified threshold, then a significance visual indicator is not assigned the respective group of cells.

Alternatively, instead of using brightness to indicate relative significance, significance visual indicators can be assigned other visual characteristics (e.g. different colors, different patterns, different gray levels, different shapes, etc.) for indicating different degrees of significance.

In other examples, instead of using rings, other types of graphical elements can be used as significance visual indicators. A significance visual indicator does not have to surround a respective group of cells. For example, a significance visual indicator can be placed adjacent a corresponding group of cells. Alternatively, a significance visual indicator can be placed in a different position in the visualization screen 100, but with some indication provided to indicate that the significance visual indicator is associated with the respective group of cells.

In the visualization screen 100, each group of cells corresponds to events that share a common pair of categorical values of the x attribute and y attribute (in other words, share the same x-y value pair). Traditionally, points that represent events that share the same x-y value pair may be plotted at the same position in a visualization screen, which results in occlusion (due to overlay) of the multiple points representing the events sharing the same x-y value pair. In contrast, in accordance with some implementations, instead of plotting cells representing events that share the same x-y value pair at the same position in the graphical visualization 100, the cells are placed at different nearby positions close to each other, to form a group of the cells representing the events sharing the same x-y value pair. The cells in this group are placed in a respective region of the graphical visualization 100, where the region can have a circular shape, an oval shape, an ellipsoid shape, or any other shape.

Within each region, the cells are sorted according to the values of the third attribute (which in the example is the Outcome attribute). Sorting the cells of a region refers to placing the cells in the region according to the values of the third attribute. By performing the sorting, cells are positioned in proximity to each other according to the values of the third attribute, such that cells that share or have relatively close values of the third attribute are placed closer to each other than cells that have greater differences in the values of the third attribute.

The sorting allows sub-groups of cells to be formed within each group. Thus, for example, in group 104 in FIG. 1, a first sub-group includes the cells assigned the red color, while a second sub-group includes cells assigned the green color. The cells assigned the green color in the group 104 are placed around the cells assigned the red color. By sorting the cells such that respective sub-groups are visible, a user can more easily determine the relative amounts of cells assigned to different values of the third attribute.

Figure 2:
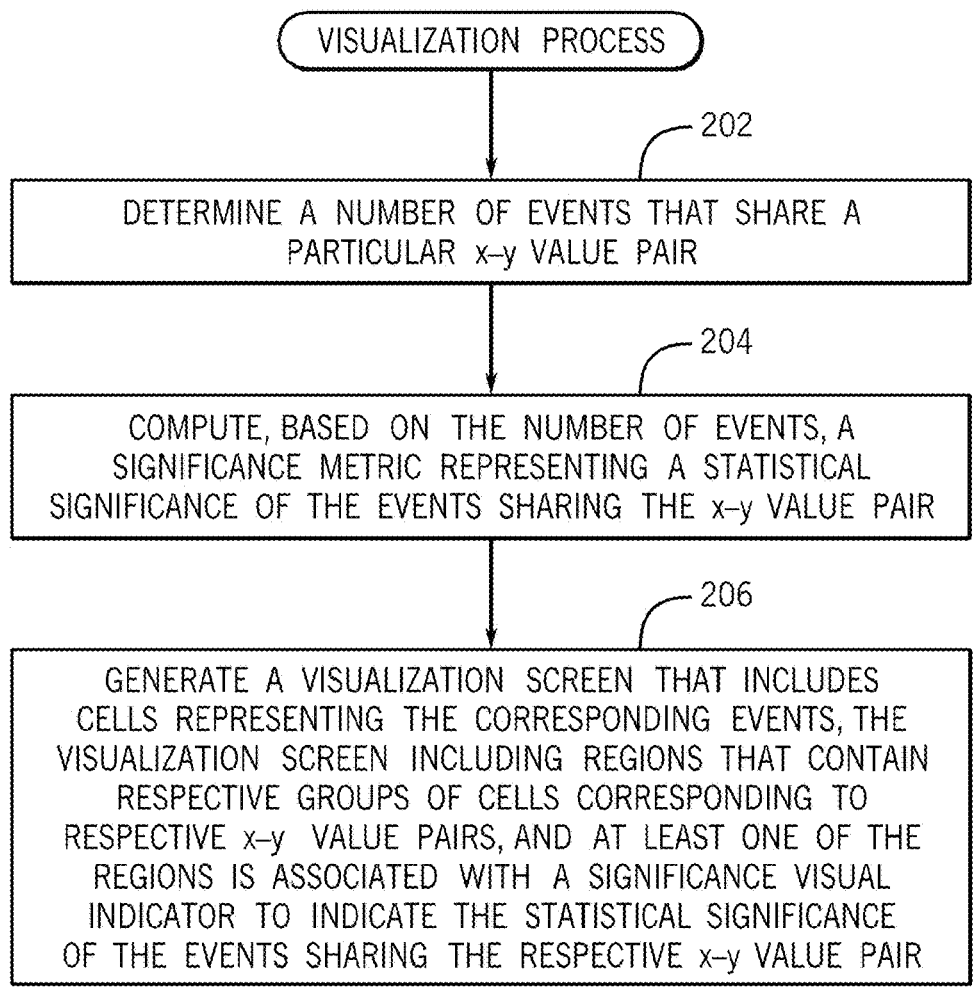
FIG. 2 is a flow diagram of a process of visualizing attribute relationships along with significance visual indicators, in accordance with some implementations.

FIG. 2 is a flow diagram of a visualization process according to some implementations, for visualizing events expressed by received data records that each includes multiple attributes. The multiple attributes can include an x attribute and a y attribute. The visualization process determines (at 202) a number of the events that share a particular pair of values of the x and y attributes (an x-y value pair). Although reference is made to events that share a particular pair of attribute values, it is noted that in other implementations, events can share a collection of values of more than two attributes.

The visualization process next computes (at 204), based on the number of events determined at 202, a significance metric representing a statistical significance of the events sharing the x-y value pair. As discussed further below, the significance metric can be an odds ratio metric, chi square metric, or any other statistical measure that is applicable for categorical attributes. In other examples, other metrics can be used for representing a statistical significance of an x-y value pair.

The visualization process then generates (at 206) a visualization screen (e.g. visualization screen 100 in FIG. 1) that includes cells representing the corresponding events. The visualization screen includes regions that contain respective groups of cells corresponding to respective x-y value pairs. Also, at least one of the regions is associated with a significance visual indicator (e.g. 110 or 112 in FIG. 1) to indicate the statistical significance of the events sharing the respective x-y value pair.

Figure 3:
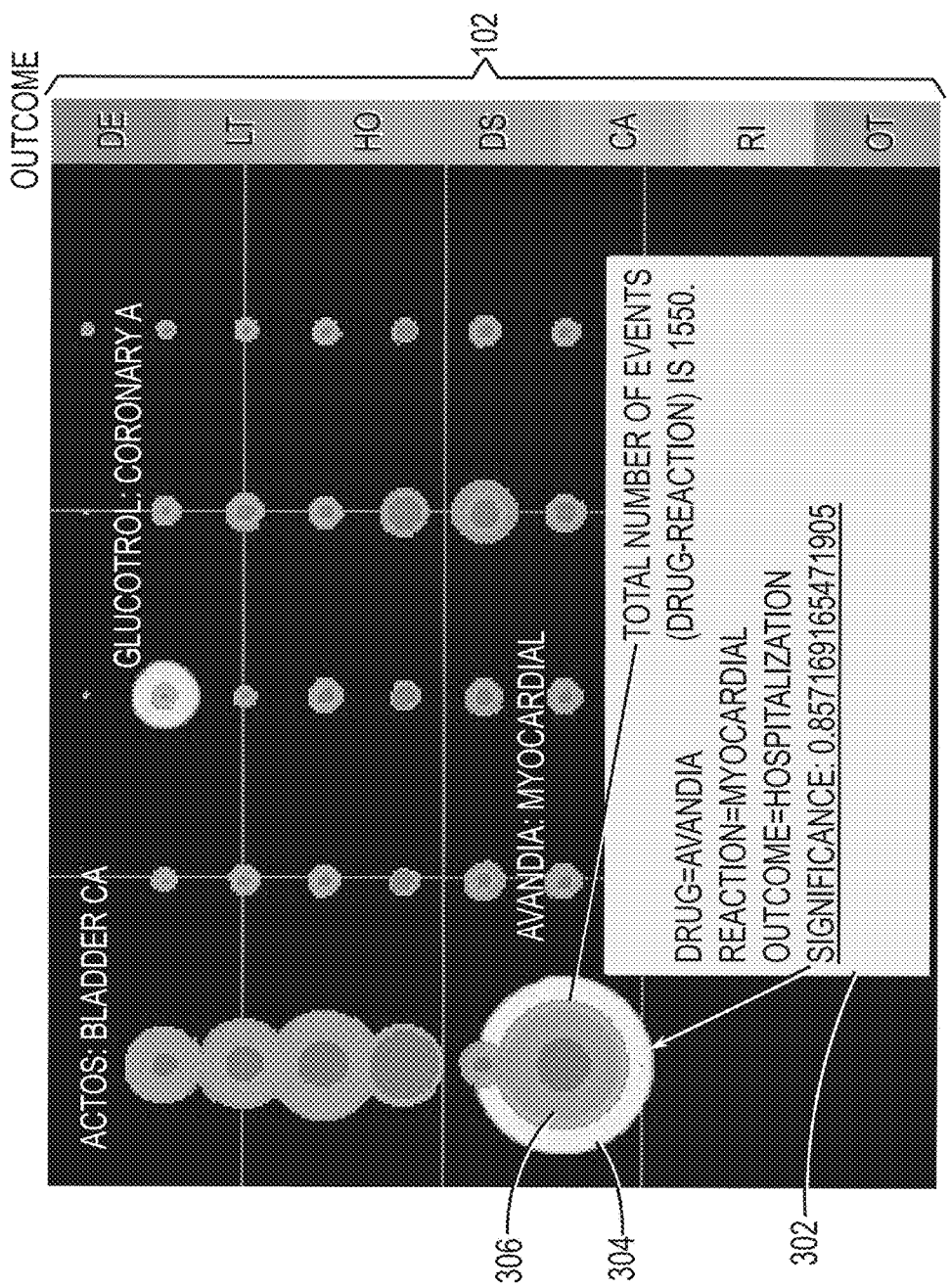
FIGS. 3-5 are graphical views of additional example visualization screens according to some implementations.

The generated visualization screen can be an interactive visualization screen. A portion of a visualization screen is depicted in FIG. 3, which shows a significance visual indicator 304 around a group 306 of cells. A user can move a cursor (such as by using a user input device) over the significance visual indicator 304 (or any other significance visual indicator) in the visualization screen. When the cursor is moved over the significance visual indicator 304, a pop-up dialog box 302 is displayed to provide detailed information regarding the group 306 of cells associated with the selected significance visual indicator 304. In the example dialog box 302, the categorical value (Avandia) of the Drug attribute, the categorical value (Myocardial) of the Reaction attribute, and the categorical value (Hospitalization) of the Outcome attribute are depicted. Additionally, the number of cells (1,550) that share the specific x-y value pair (Avandia-Myocardial pair) corresponding to the selected group 306 of cells is also depicted. In addition, the dialog box 302 includes the corresponding value (e.g. 0.857169165471905) of the significance metric.

Although reference is made to user interaction that moves a cursor over a significance visual indicator, it is noted that in other examples, other interactive inputs can be provided, such as a touch on a touchscreen display device, and so forth.

The computation of a significance metric can be based on a contingency table (or other type of contingency data structure). An example of a contingency table is depicted below:

|                | y value | other y values |
|----------------|---------|----------------|
| x value        | a       | b              |
| other x values | c       | d              |

The example contingency table has four entries, including four respective values: a, b, c, d. In the contingency table, "x value" represents a particular value of the x attribute, while "y value" represents a particular value of they attribute. In the contingency table, "other x values" represent other values of the x attribute (other than the particular x attribute value), and "other y values" represent other values of they attribute (other than the particular y attribute value). More, generally, a contingency data structure includes parameters that indicate numbers of events that share respective x-y value pairs.

The parameter a represents the number of occurrences (in other words the number of events) that share the pair of the particular x value and particular y value (particular x-y value pair). The parameter b represents the sum of the numbers of data records that share the particular x attribute value and other y attribute values. For example, assume that there are two other y attribute values, y1 and y2, that are different from the particular y value. N1 represents the number of events that share the x-y1 value pair, while N2 represents the number of events that share the x-y2 value pair. Then the parameter b is equal to the sum of N1 and N2.

The c parameter represents the sum of the numbers of events that share the particular y attribute value with the other x attribute values. For example, assume that there are three other x attribute values, x1, x2, and x2, that are different from the particular x value. M1 represents the number of events that share the x1-y value pair, M2 represents the number of events that share the x2-y value pair, and M3 represents the number of events that share the x3-y value pair. Then the parameter c is equal to the sum of M1, M2, and M3.

The parameter d represents the sum of the numbers of events that share the other x attribute values and the other y attribute values.

Mathematically, assume that X represents the number of occurrences of all values of the x attribute, Y represents the number of occurrences of all values of they attribute, and XY represents the number of occurrences of all x-y value pairs. Then, given a, the parameters b, c, and d can be computed as follows:

$$b = X - a,$$

$$c = Y - a, \text{ and}$$

$$d = XY - a - b - c$$

The parameters a, b, c, d represent respective distributions of certain x-y value pairs. Given the values of the parameters a, b, c, d, an odds ratio metric can be computed, where the odds ratio metric is used for estimating a relationship between two variables, in this case the x and y attributes. In some examples, the odds ratio metric is computed as follows:

$$\text{odds}(x, y) = \frac{a^2 \cdot d}{(b+1) \cdot (c+1)}.$$

Intuitively, if a and d are relatively high, then the particular y value co-occurs with the particular x value more frequently than with other x value. The same is also true if b and c are relatively low. The equation above adds the value "1" to b and c to avoid division by zero. Also, the influence of a has been increased, since it represents the co-occurrence of the particular x-y value pair.

Alternatively, another metric (which is a different form of odds ratio metric), can be computed as follows:

$$\text{odds}(x, y) = \frac{a}{b} \cdot \frac{d}{c}.$$

In other examples, other types of significance metrics can be used.

The odds ratio metric, or other significance metric, can be considered a discriminative metric that provides an indication that events sharing a certain x-y value pair have higher than expected occurrence, which is an indication of greater significance of such events. For example, in the context of drug-reaction pairs, the odds ratio metric can discriminate unusual (or unexpected) drug-reaction pairs from usual (or expected) drug-reaction pairs. The calculation of the odds ratio metric, or other significance metric, is a contingency calculation in that the calculation is contingent on the number of events (represented by a) sharing a particular x-y value pair as compared to numbers of events (represented by b, c, and d) sharing other collections of x and y attribute values. More generally, a contingency calculation refers to a calculation that is dependent (or contingent upon) relative numbers of events sharing respective collections of x and y attribute values.

The value of a significance metric for a given group of cells can be computed globally or locally. If computed globally, the significance metric value is based on parameters of a, b, c, and d derived over an entire dataset that contains all data records received so far. On the other hand, local computation of the significance metric value is based on parameters of a, b, c, and d derived over just the data records represented in a visualization screen, which may visualize just a subset (less than the entirety) of the dataset. The X, Y, and XY values discussed above are different depending on whether the computation of significance metric values is a global or local computation.

Figure 4:
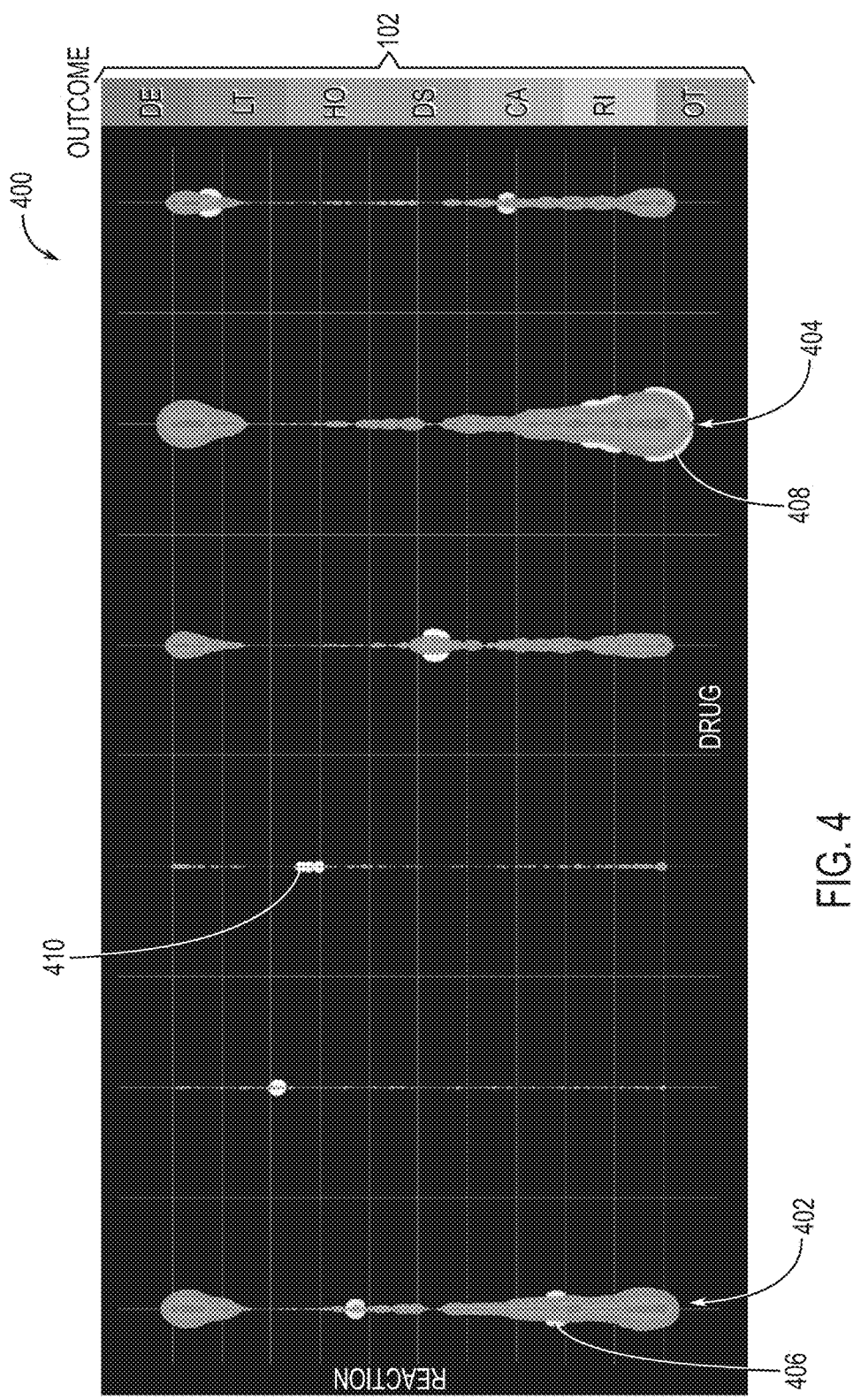

Although the various groups of cells depicted in the graphical visualization 100 of FIG. 1 are for the most part placed in discrete regions that do not overlap each other, there can be instances where large amounts of data records at neighboring x-y value pairs may result in some overlap of cells for different x-y value pairs. FIG. 4 depicts a visualization screen 400 that has overlapping regions. Overlapping regions corresponding to a first drug (x1) is represented as 402, and overlapping regions corresponding to another drug (x2) is represented as 404 in FIG. 4.

FIG. 4 depicts a significance visual indicator 406 for one of the groups of cells associated with drug x1, and a significance visual indicator 408 for one of the groups of cells associated with drug x2. A significance visual indicator 410 is also provided for a group of cells having a relatively small number of events (and thus a relatively small number of cells). This provides an example in which a relatively infrequent x-y value pair can have a relatively high significance.

Figure 5:
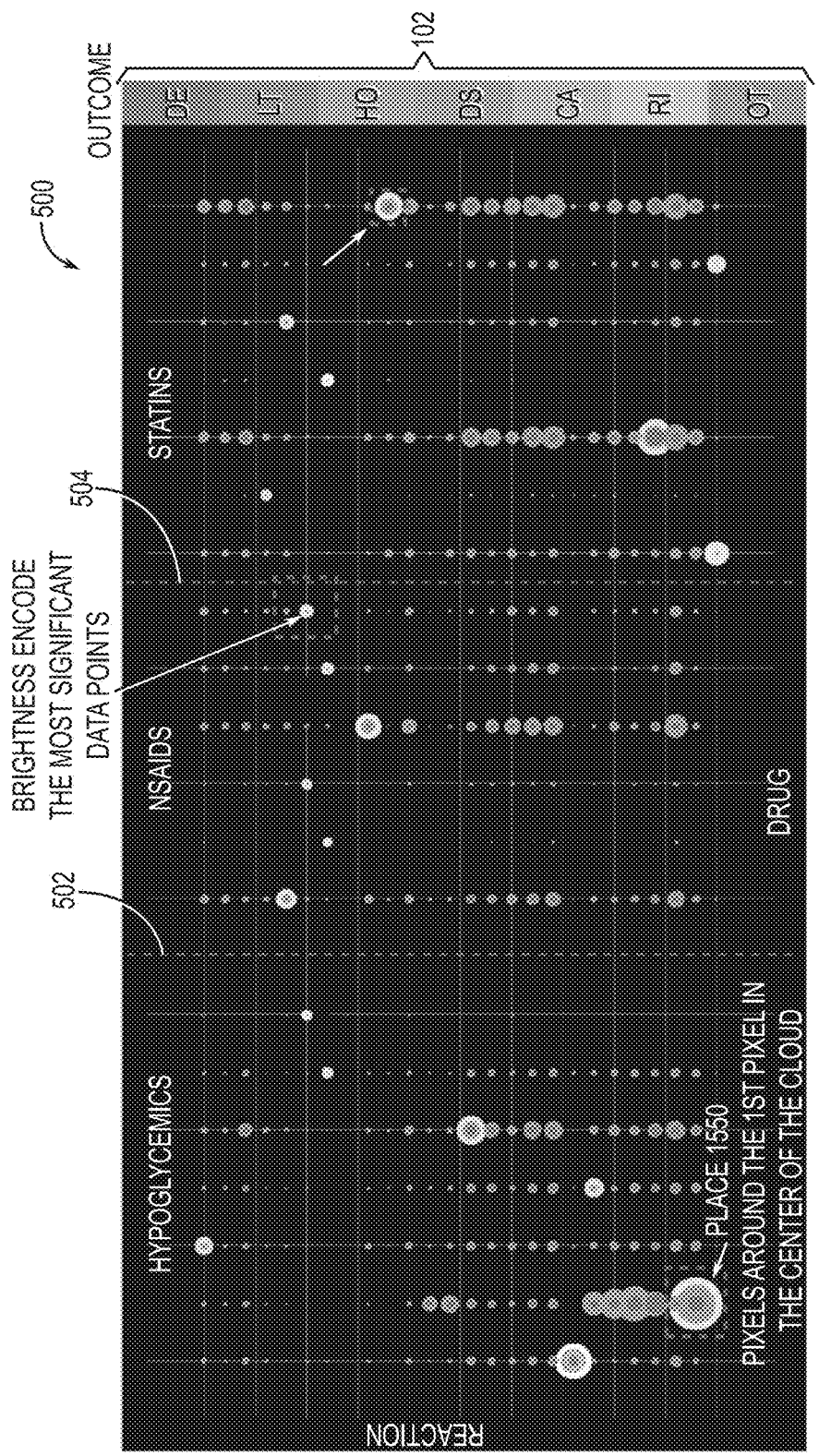

FIG. 5 depicts a visualization screen 500 that shows events associated with three classes of the Drug attribute, including a hypoglycemics class, an NSAIDs class, and a statins class, which are divided by dashed vertical lines 502 and 504. The drugs represented by the visualization screen 500 are divided into these three classes. Within each class, the placement of columns can be ordered according to frequencies (in terms of number of events).

Figure 6:
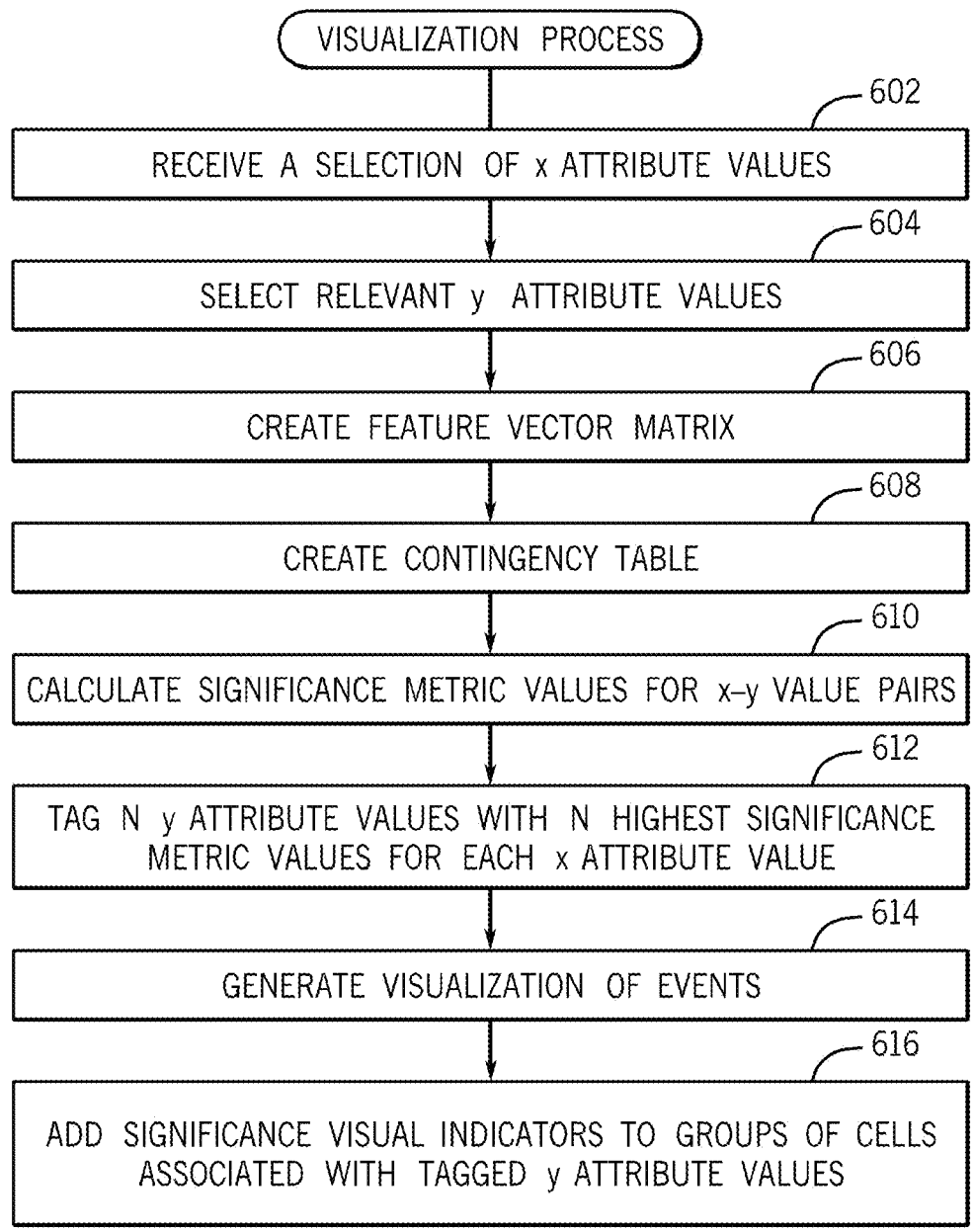
FIG. 6 is a flow diagram of a visualization process that includes adding significance visual indicators to a visualization in accordance with further implementations.

FIG. 6 is a flow diagram of a visualization process of generating a visualization screen according to further implementations. The process of FIG. 6 receives (at 602) a selection of the values of an x attribute that are to be displayed in a visualization. It is assumed that there are n values of the x attribute. The selection of the values of the x attribute can be performed by a user, by an application, or by some other entity.

Next, using a relevance determination process, relevant values of they attributes are selected (at 604). It is assumed that there are m selected relevant values of they attribute. Note that both m and n can be greater than or equal to 1. By using the relevance determination process, just a subset of all candidate y attribute values can be selected—the relevance determination process selects those y attribute values (from the candidate y attribute values) that are deemed to be more relevant to the x attribute values, based on frequencies of occurrence of respective x-y value pairs. For example, a y attribute value is deemed to be more relevant to a given x attribute value if a relevance value derived based on the frequency of occurrence of the pair of x and y attribute values exceeds a specified threshold. Further details of an example relevance determination process are provided in U.S. application Ser. No. 13/714,871, entitled "VISUALIZING A RELATIONSHIP OF ATTRIBUTES USING A RELEVANCE DETERMINATION PROCESS TO SELECT FROM CANDIDATE ATTRIBUTE VALUES," filed Dec. 14, 2012.

Next, the process of FIG. 6 creates (at 606) a feature vector matrix that has n rows and m columns. In some examples, this feature vector matrix is identified as M. Although reference is made to a feature vector matrix in this discussion, it is noted that other types of data structures can be employed in other implementations. The n rows of the feature vector matrix contains information for respective different x attribute values, while the m columns of the feature vector matrix contains information for respective different y attribute values. An example feature vector matrix is depicted in FIG. 7, which shows n rows corresponding to x attribute values x1, x2, ..., xn, and m columns corresponding to y attribute values y1, y2, y3, ..., ym. Each entry of the feature vector matrix corresponds to a pair of an x attribute value and a y attribute value (x-y value pair). An entry of the feature vector matrix contains a value representing a frequency of occurrence of the corresponding x-y value pair. For example, the entry at the intersection of x2 and y2 has a frequency of occurrence value 19, which indicates that there are 19 occurrences of the x2-y2 value pair.

Next, the visualization process creates (at 608) a contingency table. The parameters of the contingency table, including a, b, c, and d (as discussed above), can be derived based on content of the feature vector matrix M. More specifically, the frequency of occurrence value in each entry of the feature vector matrix M is retrieved for computing the parameters of the contingency table.

Next, based on the content of the contingency table, the visualization process calculates (at 610) significance metric values for x-y value pairs.

For each x attribute value, the N y attributes values associated with the N highest significance metric values are tagged (at 612). Tagging the N y attribute values results in identification of N x-y value pairs (associated with the tagged N y attribute values) for each x attribute value. The N x-y value pairs associated with the N tagged y attribute values are the x-y value pairs for significance visual indicators are to be provided.

The visualization process then generates (at 614) a visualization of events by plotting groups of cells onto a visualization screen. The visualization process then adds (at 616) significance visual indicators to the groups of cells associated with the tagged y attribute values.

FIG. 8 is a block diagram of an example system 800 that has a significance metric and contingency calculator 802 and a significance visualization module 804 according to some implementations, which can perform various tasks discussed above, including those tasks depicted in FIGS. 2 and 6. The significance metric and contingency calculator 802 can compute significance metric values based on contingency calculations, such as according to tasks 602-610 depicted in FIG. 6. The significance visualization module 804 can produce visualization screens according to some implementations, such as those depicted in FIGS. 1 and 3-5.

The significance metric and contingency calculator 802 and significance visualization module 804 can be implemented as machine-readable instructions executable on one or multiple processors 806. A processor can include a microprocessor, microcontroller, processor module or subsystem, programmable integrated circuit, programmable gate array, or another control or computing device. The processor(s) 806 can be connected to a network interface 808 and a storage medium (or storage media) 810.

The storage medium (storage media) 810 can store a dataset 812 (containing data records) that has been received by the system 800. The dataset 810 is processed by the significance metric calculator 802 and the significance visualization module 804 to produce visualization screens according to some implementations.

The storage medium (or storage media) 810 can be implemented as one or multiple computer-readable or machine-readable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage devices. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some or all of these details. Other implementations may include modifications and variations from the details discussed above. It is intended that the appended claims cover such modifications and variations.

What is claimed is:

1. A method comprising:
    determining, by a system having a processor, a number of events that share a first collection of values of plural attributes;
    computing, by the system using a contingency calculation based on the number of events, a discriminative metric representing a statistical significance of the events that share the first collection of values of the plural attributes, the statistical significance represented by the computed discriminative metric indicating that the events that share the first collection of values of the plural attributes have a higher expected occurrence than events sharing a different collection of values of the plural attributes;
    displaying, by the system, a visualization that includes cells representing respective events, the visualization including a region containing a subset of the cells, and the visualization including plural axes respectively representing the plural attributes, wherein cells of the subset represent the events that share the first collection of values of the plural attributes;
    assigning, by the system, a visual characteristic of a significance visual indicator based on a value of the computed discriminative metric, the significance visual indicator placed in the visualization and associated with the region to indicate the statistical significance of the events sharing the first collection of values of the plural attributes; and
    responsive to user selection of the significance visual indicator in the visualization, causing display, by the system, of information regarding the subset of the cells associated with the selected significance visual indicator.

2. The method of claim 1, further comprising:
    creating a contingency data structure having a first entry containing the number of events that share the collection of values of the plural attributes,
    wherein computing the discriminative metric uses the contingency data structure.

3. The method of claim 2, wherein the first collection of values includes a first value of a first attribute represented by a first axis of the visualization, and a second value of a second attribute represented by a second axis of the visualization, and wherein the contingency data structure further includes additional entries that include:
    a second entry containing a number of events that share the first value of the first attribute and other values of the second attribute,
    a third entry containing a number of events that share the second value of the second attribute and other values of the first attribute, and
    a fourth entry containing a number of events that share the other values of the first attribute and the other values of the second attribute.

4. The method of claim 1, wherein computing the discriminative metric comprises computing an odds ratio metric that is computed from a ratio of a first value to a second value, the first value based on the number of events that share the first collection of values of the plural attributes, and the second value based on a number of events that share the different collection of values of the plural attributes.

5. The method of claim 1, wherein the significance visual indicator includes a graphical element having a brightness, the method comprising:

setting a degree of the brightness based on the value of the discriminative metric.

6. The method of claim 5, wherein the graphical element includes a ring around the region containing the subset of cells, the ring having the set degree of the brightness.

7. The method of claim 1, further comprising:
assigning different colors to the cells based on corresponding values of a further attribute of the events.

8. The method of claim 7, further comprising:
sorting the cells in the subset according to respective values of the further attribute, wherein the cells in the region are placed based on the sorting, and wherein placing the cells in the region based on the sorting causes sub-groups of the cells to be formed, wherein each of the sub-groups correspond to cells sharing a common value of the further attribute.

9. An article comprising at least one non-transitory machine-readable storage medium storing instructions that upon execution cause a system to:
create a data structure having parameters representing respective numbers of occurrences of collections of values of plural attributes occurring in events;
compute, using a contingency calculation based on the data structure, a discriminative metric representing a statistical significance of events that share a first collection of the collections of values of the plural attributes;
generate a visualization that includes cells representing respective events, the visualization including a region containing a subset of the cells, and the visualization including plural axes respectively representing the plural attributes, wherein cells of the subset represent the events that share the first collection of values of the plural attributes;
assign a visual characteristic of a significance visual indicator based on a value of the computed discriminative metric, the significance visual indicator placed in the visualization and associated with the region to indicate the statistical significance, as represented by the computed discriminative metric, of the events that share the first collection of values of the plural attributes; and
responsive to user selection of the significance visual indicator in the visualization, cause display of information regarding the events represented by the subset of the cells associated with the selected significance visual indicator.

10. The article of claim 9, wherein the visualization includes regions for respective groups of cells that correspond to respective collections of values of the plural attributes, and wherein the instructions upon execution cause the system to further decide not to provide a significance visual indicator for at least one of the regions.

11. The article of claim 10, wherein deciding to not provide a significance visual indicator for the at least one region is based on determining that a value of the discriminative metric representing a statistical significance of events corresponding to the at least one region does not satisfy a specified criterion.

12. The article of claim 10, wherein a size of each of the regions is indicative of a corresponding frequency of occurrence of events sharing the respective collection of attribute values, and wherein the statistical visual indicator is a ring around a first region of the regions, the statistical visual indicator distinct from the size of the first region.

13. The article of claim 9, wherein generating the visualization further comprises assigning colors to the cells depending upon respective values of a further attribute.

14. The article of claim 9, wherein the significance visual indicator has a brightness that depends upon the value of the computed discriminative metric.

15. A system comprising:
at least one processor; and
a non-transitory storage medium storing instructions executable on the at least one processor to:
determine a quantity of events that share a first collection of values of plural attributes;
compute, based on a contingency data structure, a discriminative metric representing a statistical significance of the events that share the first collection of values of the plural attributes, wherein the contingency data structure includes an entry containing the quantity of events that share the first collection of values of the plural attributes, the statistical significance represented by the computed discriminative metric indicating that the events that share the first collection of values of the plural attributes have a higher expected occurrence than events sharing a different collection of values of the plural attributes;
cause display of a visualization that includes cells representing respective events, the visualization including a region containing a subset of the cells, and the visualization including plural axes respectively representing the plural attributes, wherein cells of the subset represent the events that share the first collection of values of the plural attributes;
assign a visual characteristic of a significance visual indicator based on a value of the computed discriminative metric, the significance visual indicator included in the visualization and associated with the region to indicate the statistical significance of the events sharing the first collection of values of the plural attributes; and
responsive to user selection of the significance visual indicator in the visualization, cause display of information regarding the subset of the cells associated with the selected significance visual indicator.

16. The system of claim 15, wherein the significance visual indicator includes a graphical element having a brightness, wherein the instructions are executable on the at least one processor to further set a degree of the brightness based on the value of the discriminative metric, wherein the brightness of the graphical element varies according to different values of the discriminative metric.

17. The system of claim 16, wherein the graphical element includes a ring around the region containing the subset of the cells.

18. The system of claim 15, wherein the instructions are executable on the at least one processor to further:
assign different colors to the cells based on corresponding values of a further attribute of the events.

19. The system of claim 15, wherein the computing of the discriminative metric comprises computing an odds ratio metric that is computed from a ratio of a first value to a second value, the first value based on the quantity of events that share the first collection of values of the plural attributes, and the second value based on a quantity of events that share the different collection of values of the plural attributes,
the data structure including another entry that includes the quantity of events that share the different collection of values of the plural attributes.

* * * * *